United States Patent
Feng et al.

(10) Patent No.: US 11,526,993 B2
(45) Date of Patent: Dec. 13, 2022

(54) SYSTEM AND METHOD FOR AUTOMATIC SEGMENTATION OF MUSCLES FROM HIGH-RESOLUTION MRI USING 3D DEEP CONVOLUTIONAL NEURAL NETWORK

(71) Applicant: SPRINGBOK, INC., Charlottesville, VA (US)

(72) Inventors: Xue Feng, Silver Spring, MD (US); Renkun Ni, College Park, MD (US); Anudeep Konda, Los Angeles, CA (US); Silvia S. Blemker, Charlottesville, VA (US); Joseph M. Hart, Charlottesville, VA (US); Craig H. Meyer, Charlottesville, VA (US)

(73) Assignee: Springbok, Inc., Charlottesville, VA (US)

( * ) Notice: Subject to any disclaimer, the term of this patent is extended or adjusted under 35 U.S.C. 154(b) by 444 days.

(21) Appl. No.: 16/724,192

(22) Filed: Dec. 21, 2019

(65) Prior Publication Data
US 2020/0380696 A1    Dec. 3, 2020

Related U.S. Application Data

(60) Provisional application No. 62/854,623, filed on May 30, 2019.

(51) Int. Cl.
*G06T 7/174* (2017.01)
*G06T 7/00* (2017.01)

(52) U.S. Cl.
CPC .......... *G06T 7/174* (2017.01); *G06T 7/0012* (2013.01); *G06T 2207/10088* (2013.01)

(58) Field of Classification Search
None
See application file for complete search history.

(56) References Cited

U.S. PATENT DOCUMENTS

2019/0209116 A1*  7/2019  Sjöstrand ............... A61B 6/466
2021/0156943 A1*  5/2021  El-Baz ............... G01R 33/4828

OTHER PUBLICATIONS

Geng, Yan, et al. "Scene-based Segmentation of Multiple Muscles from MRI in MITK." Bildverarbeitung für die Medizin 2011. Springer, Berlin, Heidelberg, 2011. 18-22. (Year: 2011).*

(Continued)

*Primary Examiner* — Samah A Beg
(74) *Attorney, Agent, or Firm* — Arch & Lake LLP

(57) ABSTRACT

A method and an apparatus for automatic muscle segmentation are provided. The method includes receiving a high-resolution three-dimensional (3D) image obtained by a magnetic resonance imaging (MM) system and splitting the high-resolution 3D image into high-resolution 3D sub-images. Furthermore, the method includes acquiring low-resolution 3D sub-images of the high-resolution 3D sub-images and determining a boundary box within each corresponding low-resolution 3D sub-image. Moreover, the method includes determining a crop box for each boundary box, cropping each high-resolution 3D sub-image based on its corresponding crop box, and segmenting at least one muscle from the cropped box high-resolution 3D sub-image.

21 Claims, 14 Drawing Sheets
(11 of 14 Drawing Sheet(s) Filed in Color)

(56) References Cited

OTHER PUBLICATIONS

Andrews, Shawn, and Ghassan Hamarneh. "The generalized log-ratio transformation: learning shape and adjacency priors for simultaneous thigh muscle segmentation." IEEE transactions on medical imaging 34.9 (2015): 1773-1787. (Year: 2015).*

Wang, Lei, et al. "Principles and methods for automatic and semi-automatic tissue segmentation in MRI data." Magnetic Resonance Materials in Physics, Biology and Medicine 29.2 (2016): 95-110. (Year: 2016).*

Ghosh, Shrimanti, et al. "Automated 3D muscle segmentation from MRI data using convolutional neural network." 2017 IEEE International Conference on Image Processing (ICIP). IEEE, 2017. (Year: 2017).*

* cited by examiner

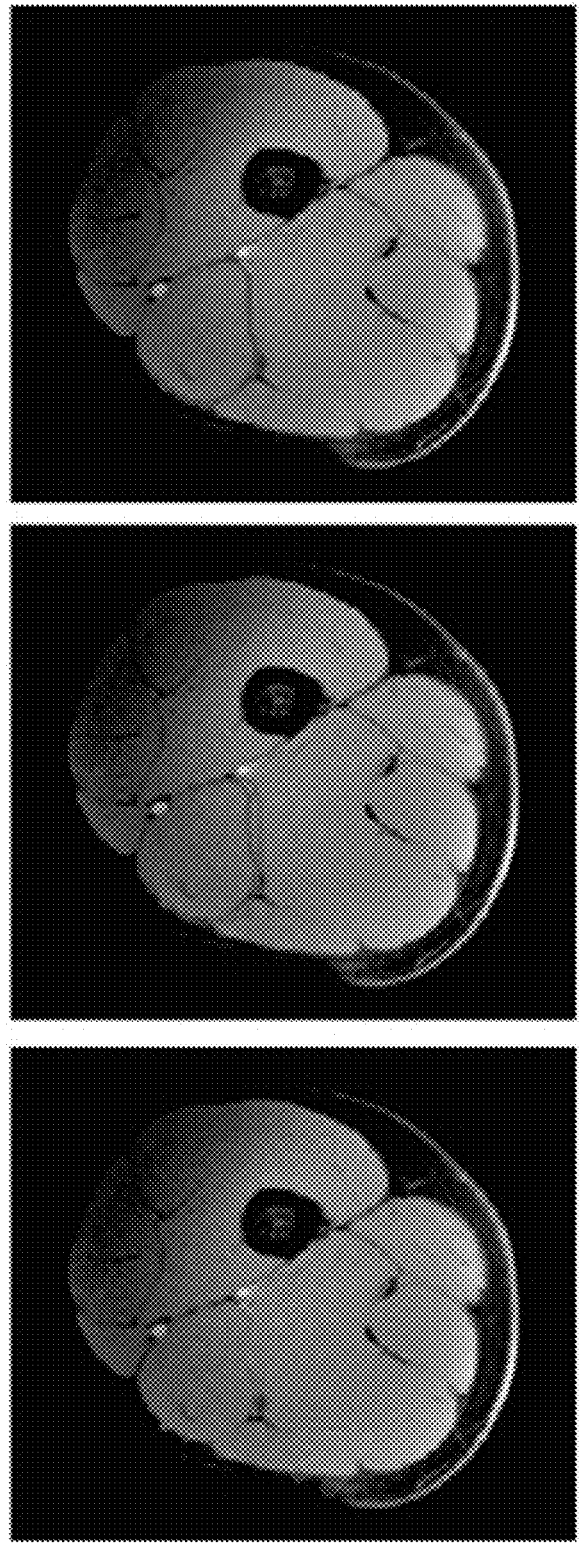

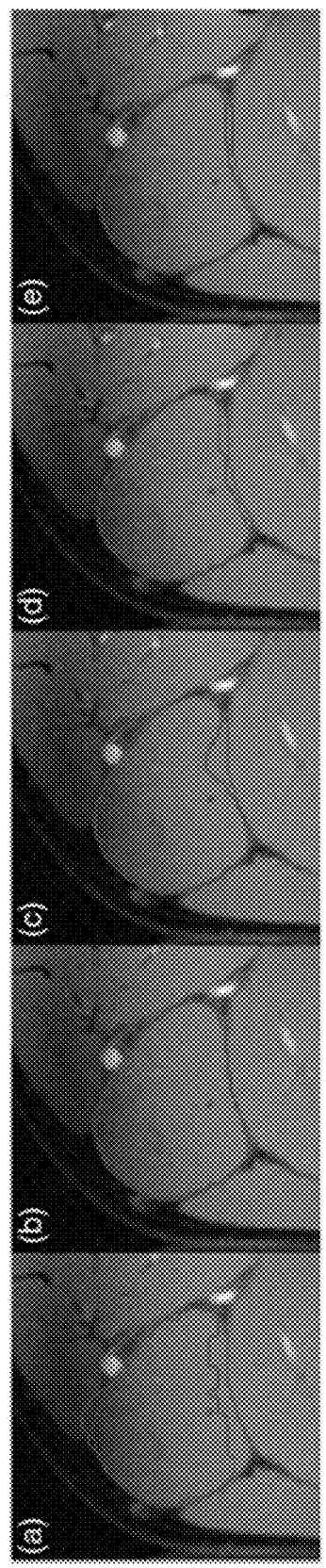

SYSTEM AND METHOD FOR AUTOMATIC SEGMENTATION OF MUSCLES FROM HIGH-RESOLUTION MRI USING 3D DEEP CONVOLUTIONAL NEURAL NETWORK

CROSS-REFERENCE TO RELATED APPLICATION

This application is based upon and claims priority to Provisional Application No. 62/854,623 filed on May 30, 2019, the entire contents thereof are incorporated herein by reference.

TECHNICAL FIELD

The present disclosure relates to the field of magnetic resonance imaging (MRI) system imaging, and more particularly, to a method and apparatus for automatic muscle segmentation.

BACKGROUND

Several techniques have been developed for automatic muscle segmentation, such as atlas-based and shape-based methods. However, these methods may fail when the edge information is minimal. Recently, deep convolutional neural network (DCNN) has been applied in many medical image segmentation tasks from MRI or computed tomography (CT) images. However, the graphics processing unit (GPU) memory and computation speed limit a direct adoption of DCNN with large 3D data set since high-resolution raw data cannot fit into the GPU without image compression, which leads to significant loss of spatial resolution and boundary information.

SUMMARY

Examples of the present disclosure provide a method for automatic segmentation of muscles from high-resolution MRI images.

According to a first aspect of the present disclosure, a computer-implemented method for automatic muscle segmentation. The method may include receiving a high-resolution three-dimensional (3D) image obtained by a magnetic resonance imaging (MRI) system, splitting the high-resolution 3D image into high-resolution 3D sub-images, acquiring low-resolution 3D sub-images of the high-resolution 3D sub-images, determining a boundary box within each corresponding low-resolution 3D sub-image, wherein the boundary box encloses at least one target muscle in the low-resolution 3D image, determining a crop box for each boundary box, wherein the crop box is the boundary box increased by a ratio along each dimension, cropping each high-resolution 3D sub-image based on its corresponding crop box, and segmenting at least one muscle from the cropped box high-resolution 3D sub-image.

According to a second aspect of examples of the present disclosure, an apparatus for automatic muscle segmentation. The apparatus may include one or more processors, a display, and a non-transitory computer-readable memory storing instructions executable by the one or more processors. Wherein the instructions are configured to receive a high-resolution three-dimensional (3D) image obtained by a magnetic resonance imaging (MRI) system, split the high-resolution 3D image into high-resolution 3D sub-images, acquire low-resolution 3D sub-images of the high-resolution 3D sub-images, determine a boundary box within each corresponding low-resolution 3D sub-image, wherein the boundary box encloses at least one target muscle in the low-resolution 3D image, determine a crop box for each boundary box, wherein the crop box is the boundary box increased by a ratio along each dimension, crop each high-resolution 3D sub-image based on its corresponding crop box, and segment at least one muscle from the cropped box high-resolution 3D sub-image.

According to a third aspect of an example of the present disclosure, a non-transitory computer-readable storage medium having stored therein instructions is provided. When the instructions are executed by one or more processors or one or more graphic processing units of the apparatus, the instructions cause the apparatus to perform receiving a high-resolution three-dimensional (3D) image obtained by a magnetic resonance imaging (MRI) system, splitting the high-resolution 3D image into high-resolution 3D sub-images, acquiring low-resolution 3D sub-images of the high-resolution 3D sub-images, determining a boundary box within each corresponding low-resolution 3D sub-image, wherein the boundary box encloses at least one target muscle in the low-resolution 3D image, determining a crop box for each boundary box, wherein the crop box is the boundary box increased by a ratio along each dimension, cropping each high-resolution 3D sub-image based on its corresponding crop box, segmenting at least one muscle from the cropped box high-resolution 3D sub-image, and displaying the segmented high-resolution 3D image.

It is to be understood that both the foregoing general description and the following detailed description are examples only and are not restrictive of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate examples consistent with the present disclosure and, together with the description, serve to explain the principles of the disclosure.

FIG. 7A is an original MR volume of a leg, according to an example of the present disclosure.

FIG. 7B is a segmentation of the MR volume of a leg, according to an example of the present disclosure.

FIG. 7C is a segmentation of the MR volume of a leg, according to an example of the present disclosure.

FIG. 11A is an example output of stage one, according to an example of the present disclosure.

FIG. 11B is an example output of stage two using the ground-truth contour as the cropping basis, according to an example of the present disclosure.

FIG. 11C is an example output of stage two using stage one output with two different enlargement ratios, according to an example of the present disclosure.

FIG. 11D is an example output of stage two using stage one output with two different enlargement ratios, according to an example of the present disclosure.

FIG. 11E is an example output of stage two by averaging multiple enlargement ratios, according to an example of the present disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The present disclosure relates to a cascaded three dimensional (3D) deep convolutional neural network (DCNN) segmentation framework for fully automatic segmentation of all 35 lower limb muscles (70 on both left and right legs).

Figure 1:
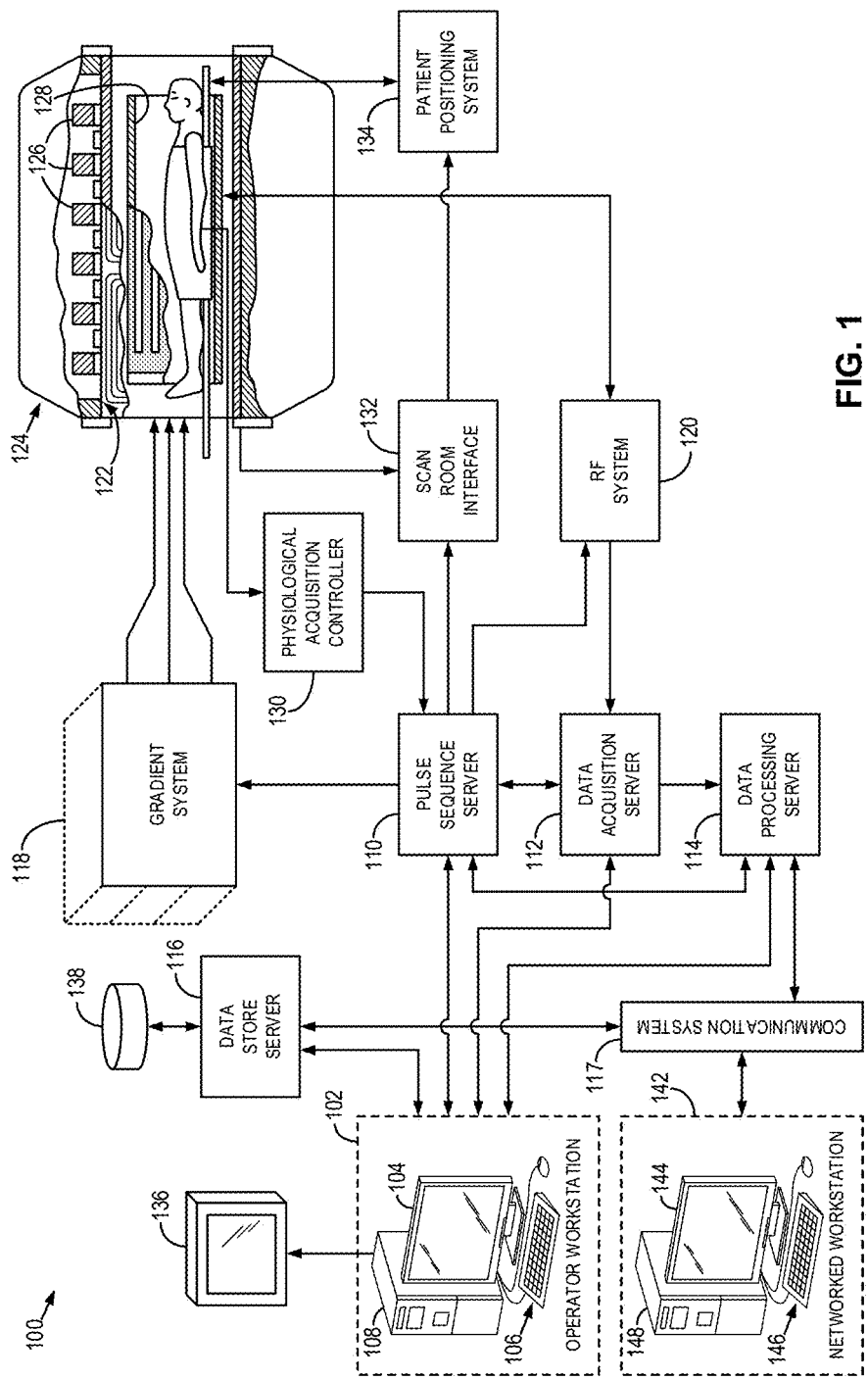
FIG. 1 is a block diagram of an MRI system, according to an example of the present disclosure.

FIG. 1 shows an example of a magnetic resonance imaging (MRI) system 100. The MRI system 100 includes an operator workstation 102, which will typically include a display 104, one or more input devices 106, such as a keyboard and mouse, and a processor 108. The processor 108 may include a commercially available programmable machine running a commercially available operating system. The operator workstation 102 provides the operator interface that enables scan prescriptions to be entered into the MRI system 100. In general, the operator workstation 102 may be coupled to four servers: a pulse sequence server 110; a data acquisition server 112; a data processing server 114; and a data store server 116. The operator workstation 102 and each server 110, 112, 114, and 116 are connected to communicate with each other. For example, the servers 110, 112, 114, and 116 may be connected via a communication system 117, which may include any suitable network connection, whether wired, wireless, or a combination of both. As an example, the communication system 117 may include both proprietary or dedicated networks, as well as open networks, such as the internet.

The pulse sequence server 110 functions in response to instructions downloaded from the operator workstation 102 to operate a gradient system 118 and a radiofrequency ("RF") system 120. Gradient waveforms necessary to perform the prescribed scan are produced and applied to the gradient system 118, which excites gradient coils in an assembly 122 to produce the magnetic field gradients $G_x$, $G_y$, and $G_z$ used for position encoding magnetic resonance signals. The gradient coil assembly 122 forms part of a magnet assembly 124 that includes a polarizing magnet 126 and a whole-body RF coil 128.

RF waveforms are applied by the RF system 120 to the RF coil 128, or a separate local coil (not shown in FIG. 1), in order to perform the prescribed magnetic resonance pulse sequence. Responsive magnetic resonance signals detected by the RF coil 128, or a separate local coil (not shown in FIG. 1), are received by the RF system 120, where they are amplified, demodulated, filtered, and digitized under direction of commands produced by the pulse sequence server 110. The RF system 120 includes an RF transmitter for producing a wide variety of RF pulses used in MRI pulse sequences. The RF transmitter is responsive to the scan prescription and direction from the pulse sequence server 110 to produce RF pulses of the desired frequency, phase, and pulse amplitude waveform. The generated RF pulses may be applied to the whole-body RF coil 128 or to one or more local coils or coil arrays (not shown in FIG. 1).

The RF system 120 also includes one or more RF receiver channels. Each RF receiver channel includes an RF preamplifier that amplifies the magnetic resonance signal received by the coil 128 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2}$$

and the phase of the received magnetic resonance signal may also be determined according to the following relationship:

$$\varphi = \tan^{-1}\left(\frac{Q}{I}\right)$$

The pulse sequence server 110 also optionally receives patient data from a physiological acquisition controller 130. By way of example, the physiological acquisition controller 130 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 110 to synchronize, or "gate," the performance of the scan with the subject's heart beat or respiration.

The pulse sequence server 110 also connects to a scan room interface circuit 132 that receives signals from various sensors associated with the condition of the patient and the magnet system. It is also through the scan room interface circuit 132 that a patient positioning system 134 receives commands to move the patient to desired positions during the scan.

The digitized magnetic resonance signal samples produced by the RF system 120 are received by the data acquisition server 112. The data acquisition server 112 operates in response to instructions downloaded from the operator workstation 102 to receive the real-time magnetic resonance data and provide buffer storage, such that no data is lost by data overrun. In some scans, the data acquisition server 112 does little more than passing the acquired magnetic resonance data to the data processor server 114. However, in scans that require information derived from acquired magnetic resonance data to control the further performance of the scan, the data acquisition server 112 is programmed to produce such information and convey it to the pulse sequence server 110. For example, during prescans, magnetic resonance data is acquired and used to calibrate the pulse sequence performed by the pulse sequence server 110. As another example, navigator signals may be acquired and used to adjust the operating parameters of the RF system 120 or the gradient system 118, or to control the view order in which k-space is sampled. In still another example, the data acquisition server 112 may also be employed to process magnetic resonance signals used to detect the arrival of a contrast agent in a magnetic resonance angiography (MRA) scan. By way of example, the data acquisition server 112 acquires magnetic resonance data and processes it in real-time to produce information that is used to control the scan.

The data processing server 114 receives magnetic resonance data from the data acquisition server 112 and processes it in accordance with instructions downloaded from the operator workstation 102. Such processing may, for example, include one or more of the following: reconstructing two-dimensional or three-dimensional images by performing a Fourier transformation of raw k-space data; performing other image reconstruction algorithms, such as iterative or backprojection reconstruction algorithms; applying filters to raw k-space data or to reconstructed images; generating functional magnetic resonance images; calculating motion or flow images; and so on.

Images reconstructed by the data processing server 114 are conveyed back to the operator workstation 102 where they are stored. Real-time images are stored in a data base memory cache (not shown in FIG. 1), from which they may be output to operator display 112 or a display 136 that is located near the magnet assembly 124 for use by attending physicians. Batch mode images or selected real time images are stored in a host database on disc storage 138. When such images have been reconstructed and transferred to storage, the data processing server 114 notifies the data store server 116 on the operator workstation 102. The operator workstation 102 may be used by an operator to archive the images, produce films, or send the images via a network to other facilities.

The MRI system 100 may also include one or more networked workstations 142. By way of example, a networked workstation 142 may include a display 144; one or more input devices 146, such as a keyboard and mouse; and a processor 148. The networked workstation 142 may be located within the same facility as the operator workstation 102, or in a different facility, such as a different healthcare institution or clinic.

The networked workstation 142, whether within the same facility or in a different facility as the operator workstation 102, may gain remote access to the data processing server 114 or data store server 116 via the communication system 117. Accordingly, multiple networked workstations 142 may have access to the data processing server 114 and the data store server 116. In this manner, magnetic resonance data, reconstructed images, or other data may exchange between the data processing server 114 or the data store server 116 and the networked workstations 142, such that the data or images may be remotely processed by a networked workstation 142. This data may be exchanged in any suitable format, such as in accordance with the transmission control protocol (TCP), the internet protocol (IP), or other known or suitable protocols.

Figure 2:
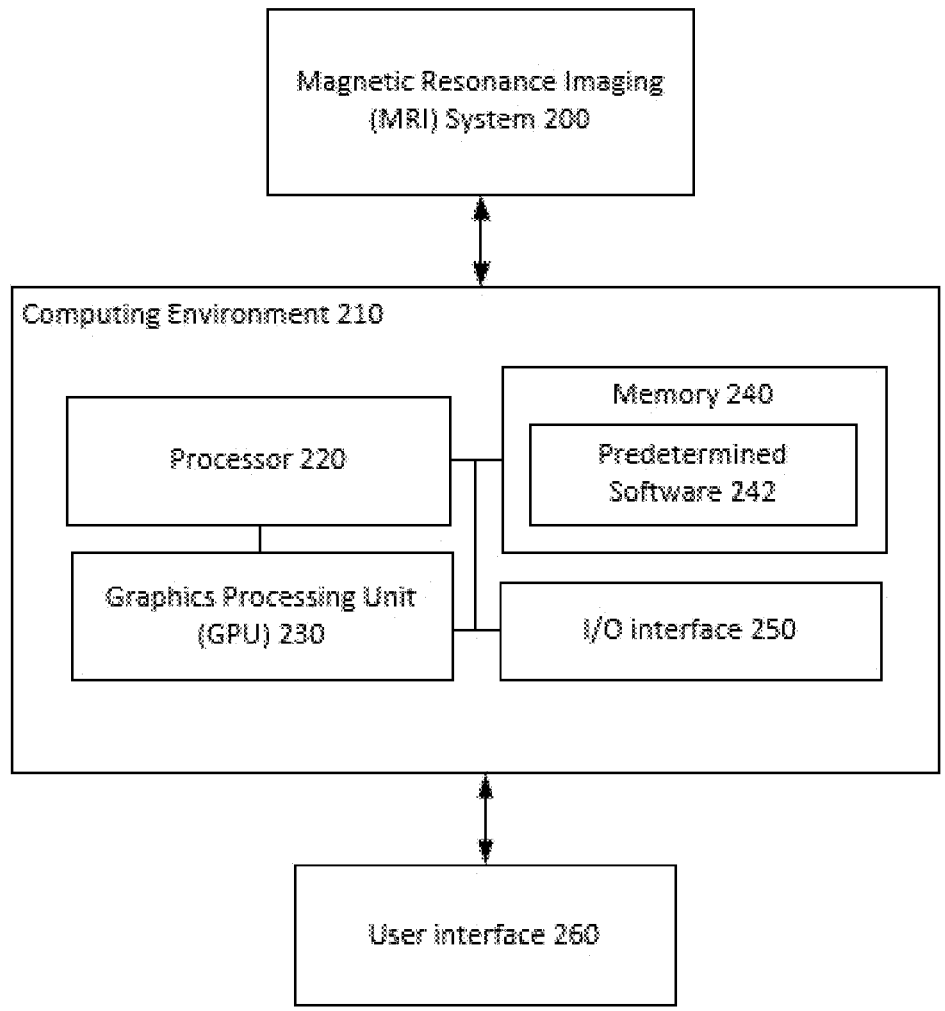
FIG. 2 is a block diagram of an MRI system with a computing environment, according to an example of the present disclosure.

FIG. 2 shows a computing environment 210 coupled with an MRI system 200 and user interface 260. Computing environment 210 can be part of data processing server 114. Computing environment 210 includes processor 220, graphics processing unit (GPU) 230, memory 240, and I/O interface 250. MRI system 200 can include multiple elements of FIG. 1. User interface 260 can include operator workstation 102 and networked workstation 142.

The processing component 220 typically controls overall operations of the computing environment 210, such as the operations associated with display, data acquisition, data communications, and image processing. The processor 220 may include one or more processors to execute instructions to perform all or some of the steps in the above described methods. Moreover, the processor 220 may include one or more modules which facilitate the interaction between the processor 220 and other components. The processor may be a Central Processing Unit (CPU), a microprocessor, a single chip machine, a GPU, or the like. GPU 230 can include one or more GPUs interconnected to execute one or more GPU executable programs.

The memory 240 is configured to store various types of data to support the operation of the computing environment 210. Examples of such data comprise instructions for any applications or methods operated on the computing environment 210, MRI datasets, image data, etc. The memory 240 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 250 provides an interface between the processor 220 and peripheral interface modules, such as a keyboard, a click wheel, buttons, and the like. The buttons may include, but are not limited to, a home button, a start scan button, and a stop scan button.

In an embodiment, the computing environment 210 may be implemented with one or more application specific integrated circuits (ASICs), digital signal processors (DSPs), digital signal processing devices (DSPDs), programmable logic devices (PLDs), field programmable gate arrays (FPGAs), graphical processing units (GPUs), controllers, micro-controllers, microprocessors, or other electronic components, for performing the above methods.

In an embodiment, there is also provided a non-transitory computer-readable storage medium comprising instructions, such as comprised in the memory 240, executable by the processor 220 in the computing environment 210, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein instructions that, when executed by a processor, cause the system to perform the above-described method.

Figure 3:
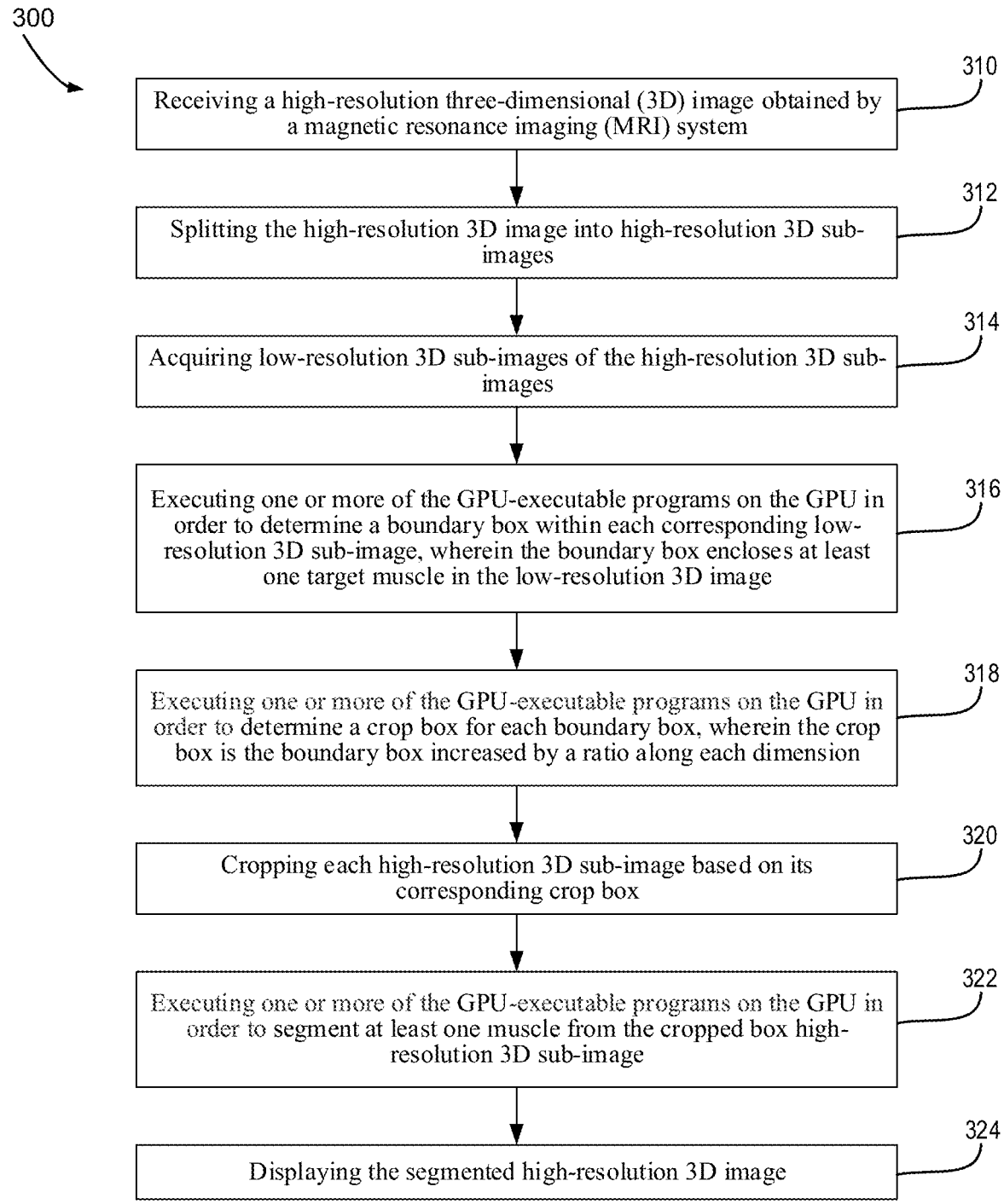
FIG. 3 is a flow chart illustrating a method for automatic muscle segmentation, according to an example of the present disclosure.

FIG. 3 shows an example flow chart setting forth the steps of a method 300 in accordance with the present disclosure.

In step 310, a high-resolution three-dimensional (3D) image obtained by a magnetic resonance imaging (MRI) system is received. As, for example, FIG. 4A (discussed below).

The high-resolution 3D image received can be pre-processed or used as received. Pre-processing can be done to, for example, improve image quality, boundary quality, reduce image size, or to correct image inhomogeneity. As, for example, FIG. 4B (discussed below).

The high-resolution 3D image can be constructed using various different datasets acquired by the MRI system. The dataset in this example for the present disclosure consists of 64 whole leg muscle images from collegiate athletes of different sports, including basketball, baseball, track, football and soccer. Proton density weighted images with fat suppression were acquired from thoracic vertebrae T12 to ankle on a Siemens 3T scanner for each subject. Two protocols were used in this example for the present disclosure: a customized 2D multi-slice spiral protocol and an optimized 2D Cartesian protocol with parallel imaging. For both protocols, the in-plane spatial resolution was 1 mm×1 mm and slice thickness was 5 mm with 200-240 continuous axial slices in total. In-plane matrix size was 512×512 for the spiral protocol and 476×380 for the Cartesian protocol. The total scan time was 25-30 minutes.

First Stage:

In step 312, the high-resolution 3D image is split into high-resolution 3D sub-images.

The splitting process can include the whole leg images split into three parts: abdomen, upper leg and lower leg based on the superior-inferior coordinates and the estimated ratios of the lengths of the three parts. To allow for variations in the ratios, in this example of the present disclosure, the split was performed with significant overlap, e.g., the upper leg images would contain many slices of abdomen and lower leg images. Therefore, for muscles that belong to the upper leg, only the upper leg images need to be considered. However, even after split, the images at the acquired resolution cannot fit into a typical GPU memory (12 Gb) so that the resolution of the input images needs to be reduced using linear interpolation and kept as high as possible without exceeding the GPU memory.

In step 314, a low-resolution 3D sub-images of the high-resolution 3D sub-images is acquired. The low-resolution 3D sub-image that does not exceed the available GPU memory while keeping high image resolution is acquired, for example, by using linear interpolation, image sampling, vectorization or other image scaling techniques. A gaussian filter, for example, can also be applied before acquiring the low-resolution 3D sub-image to prevent aliasing. Other filters and processes can be done to the image before acquiring the low-resolution 3D sub-image.

In step 316, one or more of the GPU-executable programs is executed on the GPU in order to determine a boundary box within each corresponding low-resolution 3D sub-image. The boundary box encloses at least one target muscle in the low-resolution 3D image. As, for example, FIG. 5B (discussed below), where the inner box is the boundary box.

In this example of the present disclosure, a modified 3D-UNet is used to generate the bounding box from the low-resolution images. Various other networks can be used, for example, detection-based networks such as Faster-RCNN18. But, such networks may be sub-optimal for this stage due to the limited number of training images and bounding box labels available, resulting in it being difficult and time-consuming to train a detection network with good accuracy. In addition, for most muscles, small errors in muscle localization would not impact the segmentation accuracy in the second stage, as long as all voxels of the target muscle are included in the cropped images. Therefore, a modified 3D-UNet was built to segment the low-resolution images and generate the bounding boxes based on the pixel-wise prediction maps.

The modified 3D-UNet network follows the structure of 3D-UNet which consisted of an encoder and a decoder, each with four resolution levels. Each level in the encoder contains two blocks of a 3×3×3 convolution layer, a batch normalization (BN) layer, and a rectified linear unit (ReLU) activation layer, followed by a 2×2×2 max pooling except for the bottom-most level. In the decoder, each level consists of a 2×2×2 deconvolution layer, followed by two blocks of a 3×3×3 convolution layer, a BN layer and a ReLU layer. In addition, feature maps from the encoder were concatenated to those of the same resolution in the decoder as the skip connection. The final block of the network contains a 1×1×1 convolution layer to reduce the dimension of the features to match the number of label maps, followed by a pixel-wise soft-max classifier.

Due to the relatively small training size and the large number of muscles, instead of using single models to segment all muscles in the abdomen, upper leg and lower leg regions at the same time, using dedicated separate models for each individual muscle or muscle groups can greatly improve the accuracy. However, it is time-consuming to train the models individually since there are 70 ROIs on both left and right legs. To reduce the total training time, the workflow is optimized by training the grouped muscles together in this stage. The total 70 ROIs were divided into 10 groups, each containing about 4 adjacent muscles on both legs. The division was largely based on the anatomical location along the superior-inferior direction. For each group, the input was the correspondingly split images and the output was the label map for the ROIs within the group with distinguished left and right muscles. It is worth noting that the muscles with extremely small size, such as external rotators, may disappear during the shrinkage of the original images in the first stage so that there are no predicted output labels for them. In this case, these muscles were localized based on the output of neighboring large muscles, and then cropped from the estimated regions from the original images.

In step 318, a crop box for each boundary box is determined. The crop box is the boundary box increased by a ratio along each dimension. As, for example, FIG. 5B (discussed below), where the crop box is the outer box. The ratio can be determined by different means. For example, a ratio can be independent on the location of the boundary box on the image and other factors and instead be randomly chosen from a range (e.g., 1.0-1.8, 3-3.8, 5-5.5) along each dimension. In another example, where the ratio is independent on the location of the boundary box on the image and other factors, the ratio can simply be predetermined (e.g., 1.2-1.5, 1.2-1.25, 1.1-1.3). In one more example, the ratio can also be dependent on the location of the boundary box on the image and other factors such as the size of the muscle located, the number of muscles located, and the location of the muscle within the leg (edge or center of leg). As the two edges of the bounding boxes along each dimension were sampled separately, the center of the bounding boxes may also change. However, the target muscle was guaranteed to be within the bounding box. For simplicity, the uniform distribution was used in sampling the ratio. The enlarged bounding box with varied enlargement ratio can enrich the background information at different levels and can serve as training augmentation to improve the segmentation accuracy and robustness In step 320, each high-resolution 3D sub-image based on its corresponding crop box is cropped. As, for example, FIGS. 4C and 5C (both discussed below). The high-resolution 3D sub-image is localized and cropped to match the crop box of the low-resolution 3D sub-image. For example, when rescaling the high-resolution image to a low-resolution image by 2× factor (the original resolution being a 512×512 while the low resolution is 256×256 based on the box from low resolution image) the index of each corner can be multiplied by 2 to get the matching crop box in the high-resolution image.

Second Stage:

In step 322, one or more of the GPU-executable programs is executed on the GPU in order to segment at least one muscle from the cropped box high-resolution 3D sub-image. As, for example, FIGS. 4D and 5C (both discussed below), where the outline or shaded region within the image is the segmentation of a muscle.

Segmentation is done by individual networks which were trained for each target muscle to obtain more accurate contours from images cropped based on the output of the first stage, whose resolution is close to the originally acquired images. During deployment, an averaging method that includes augmentation was also used to improve the segmentation accuracy and contour smoothness. Specifically, the method included steps where a series of images were cropped at varied bounding boxes based on the first stage output and fed into the network. The range and distribution for the enlargement ratio was the same as during training. The outputs from each input were then averaged after putting back to the uncropped original images as the final label map. The number of bounding boxes was chosen to be six as a balance between deployment time and number of augmentations. To reduce the number of models to be trained and increase the data size, left and right muscles were combined together to share the same model due to their symmetry and similarity. The total number of models to be trained was then 35. For implementation simplification without accuracy drops, networks for each muscle share the same network structure, except for the input size, which was optimized based on the average muscle sizes to maintain the aspect ratio as much as possible.

Figures 14A, 14B:
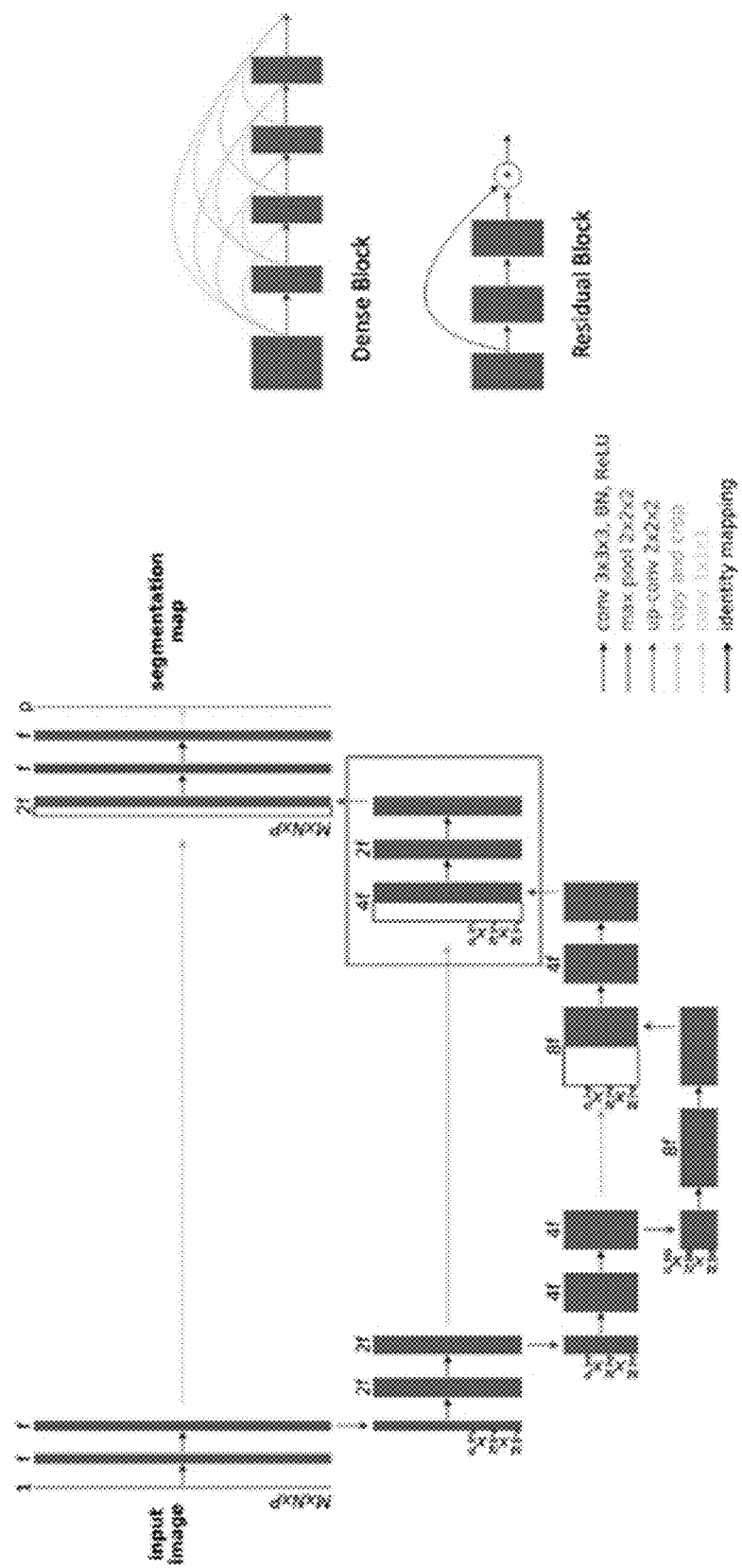
FIG. 14A is a plain U-Net structure, according to an example of the present disclosure.
FIG. 14B is a four-layer U-Net dense block, according to an example of the present disclosure.

As the goal is to maximize the accuracy, in this stage, different network structures, including the plain U-Net, U-Net with residual and with dense blocks, and different hyper-parameters, including number of layers and filters were compared to evaluate their performances. The plain U-Net having the same structure with the network in the first stage was considered as the baseline. Residual blocks contain short connections from previous convolutional layers so that the neural networks can be substantially deeper without gradient vanishing and the training becomes easier[19]. The dense blocks extend the short connections by introducing connections between all layers[20] and its adoption in segmentation showed improved performance. In this example for the present disclosure, the blocks of convolution, BN and ReLU layers in the plain U-Net with the residual blocks and the dense blocks were replaced, respectively. The detailed structure is illustrated in FIG. 14A (discussed below). For a fair comparison, the number of filters and the depth of the convolutional layers were kept the same. Furthermore, the U-Net structure is compared with two other structures, a fully convolutional network with fusion predictions (FCN- 8s) and SegNet which use deeper networks (5 resolution level) for both encoder and decoder. All the comparison studies were conducted to segment the target muscle adductor brevis, which has a relatively small volume and thus is difficult to segment.

In step 324, the segmented high-resolution 3D image is displayed. As, for example, FIGS. 4E and 5D (discussed below), where the full sub-image is seen and there is an outline of the muscle segmented. The full sub-image can be displayed in operator workstation 104 and networked workstation 142.

The segmented high-resolution 3D image can also be used to determine quantitative metrics of muscle volume. The volumes can be derived by summing up the number of voxels within the boundary and multiplying it by the voxel size. Additionally, a superior-inferior length can be derived by calculating the number of axial slices and multiplying by the slice thickness.

In another example of the present disclosure, a segmentation workflow can be seen in FIG. 4A-E. A two-stage process is disclosed that captures location and detailed features respectively and trained on the 3D images with different resolutions.

Figure 4A:
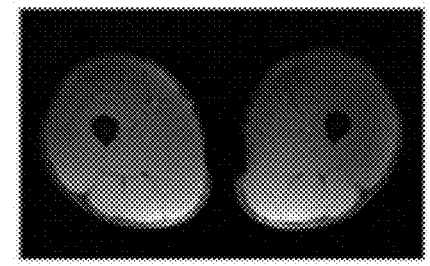
FIG. 4A is a high-resolution 3D sub-image, according to an example of the present disclosure.
Figure 4B:
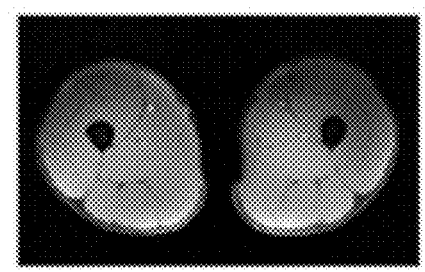
FIG. 4B is a corrected low-resolution 3D sub-image, according to an example of the present disclosure.
Figure 4C:
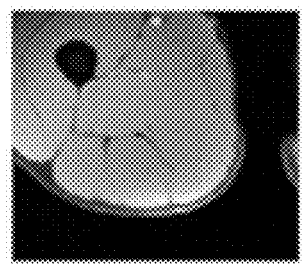
FIG. 4C is a cropped high-resolution 3D sub-image, according to an example of the present disclosure.
Figure 4D:
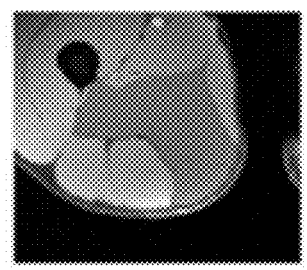
FIG. 4D is a segmented cropped high-resolution 3D sub-image, according to an example of the present disclosure.
Figure 4E:
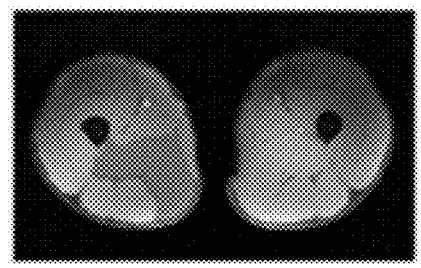
FIG. 4E is a segmented high-resolution 3D sub-image, according to an example of the present disclosure.

FIG. 4A-4E shows a workflow of the automated segmentation framework for one target muscle. FIG. 4A shows a high-resolution 3D sub-image of an MRI scanned pair of legs. FIG. 4B shows a high-resolution 3D sub-image of an MRI scanned pair of legs that has been pre-processed. Pre-processing was used to correct the image inhomogeneity due to radiofrequency field (B1) variations was corrected using improved nonparametric nonuniform intensity normalization (N3) bias correction. FIG. 4C shows a high-resolution 3D sub-image of an MRI scanned leg that has been localized and cropped. FIG. 4D shows a cropped segmented high-resolution 3D sub-image of an MRI scanned leg after individual muscle segmentation. FIG. 4E shows a segmented high-resolution 3D sub-image of an MRI scanned leg after resizing and merging from the cropped image.

Figures 5A, 5B, 5C, 5D:
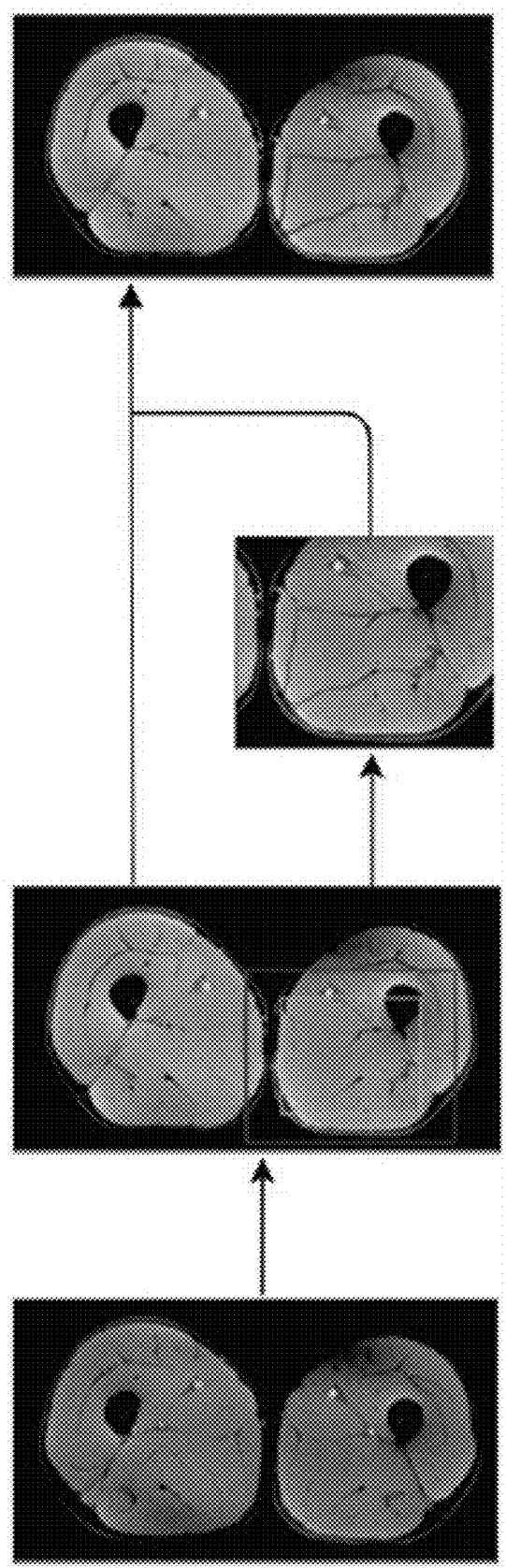
FIG. 5A is a low-resolution 3D sub-image, according to an example of the present disclosure.
FIG. 5B is a high-resolution 3D sub-image, according to an example of the present disclosure.
FIG. 5C is a cropped high-resolution 3D sub-image, according to an example of the present disclosure.
FIG. 5D is a segmented high-resolution 3D sub-image, according to an example of the present disclosure.

FIG. 5A-5D shows a workflow of the two stage DCNN model. FIG. 5A shows a low-resolution 3D sub-image of an MRI scanned leg. FIG. 5B shows a high-resolution 3D sub-image of an MRI scanned leg that has a boundary box and cropped box. The boundary box is the inner box and the cropped box is the outer box within the image. FIG. 5C shows a cropped and localized high-resolution 3D sub-image of an MRI scanned leg. FIG. 5D shows a segmented high-resolution 3D sub-image of MRI scanned legs.

Figure 6A:
FIG. 6A is an extracted bounding box low-resolution 3D sub-image, according to an example of the present disclosure.
Figure 6B:
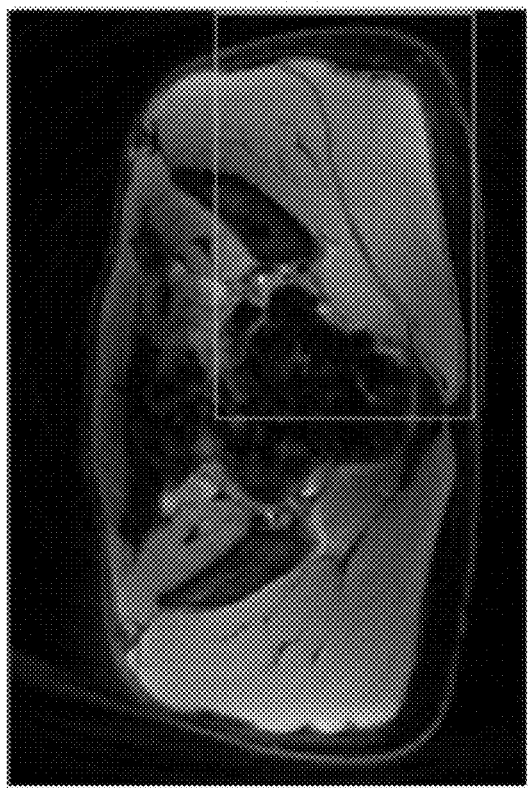
FIG. 6B is a segmented high-resolution 3D sub-image, according to an example of the present disclosure.

FIGS. 6A and 6B shows the results of bounding box extraction and Segmentation.

FIG. 6A shows extracted bounding box in first stage with ground truth contour. FIG. 6B shows segmented contours in first stage (blue), second stage (yellow) along with ground truth(green). Muscles are located correctly in first stage but not segmented properly. second stage performs much more accurate segmentation.

FIGS. 7A-7C show a comparison of the stage one, stage two, and manual segmentation. FIG. 7A shows an original MR volume of a leg. FIG. 7B shows a segmentation contour by location network and manual segmentation of the MR volume of a leg. FIG. 7C shows a segmentation contour by second stage and manual segmentation of the MR volume of a leg. The second stage segmentation has better results.

Figure 8B:
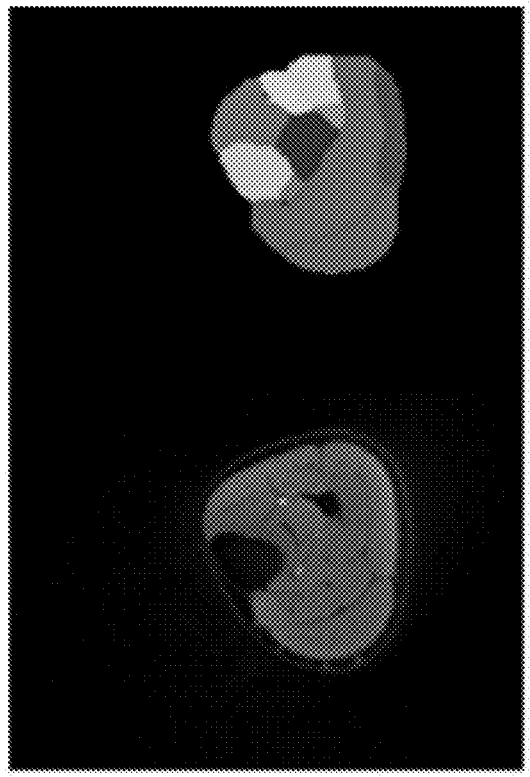
FIG. 8B is a segmented image of a lower leg, according to an example of the present disclosure.
Figure 8A:
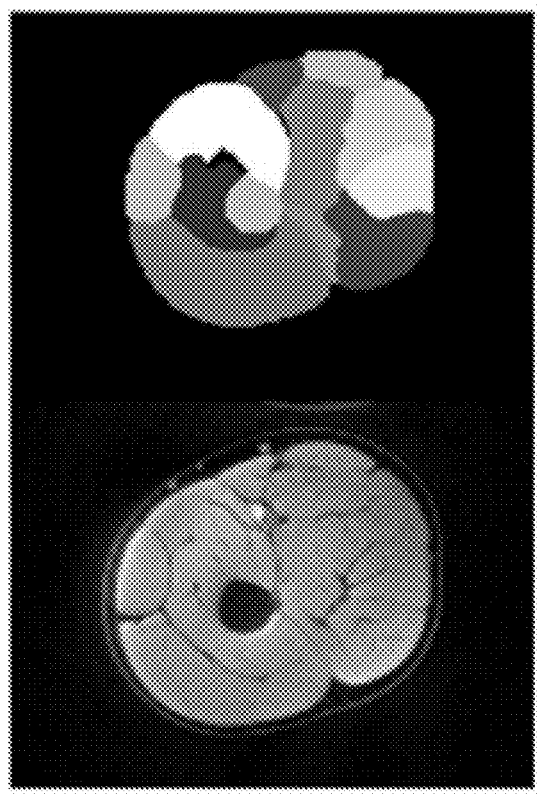
FIG. 8A is a segmented image of an upper leg, according to an example of the present disclosure.

FIGS. 8A and 8B show how a segmented image can be color coordinated to display the segmented muscles. FIG. 8A shows the results of a segmented image of an upper leg. FIG. 8B shows the results of a segmented image of a lower leg. Final segmentation results for all muscles. FIG. 8A shows one slice in the upper leg and FIG. 8B show one slice in the lower leg with the correspondingly segmented muscle maps; All muscles are segmented well even with partial boundary information.

Figure 9C:
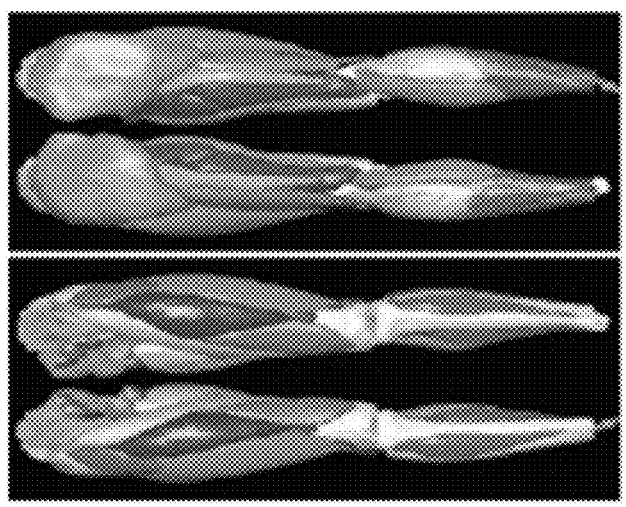
FIG. 9C is a segmented image of a pair of legs, according to an example of the present disclosure.
Figure 9B:
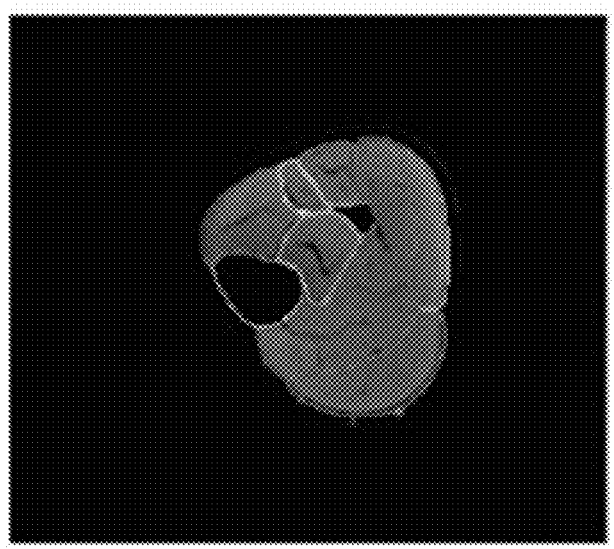
FIG. 9B is a segmented image of a lower leg, according to an example of the present disclosure.
Figure 9A:
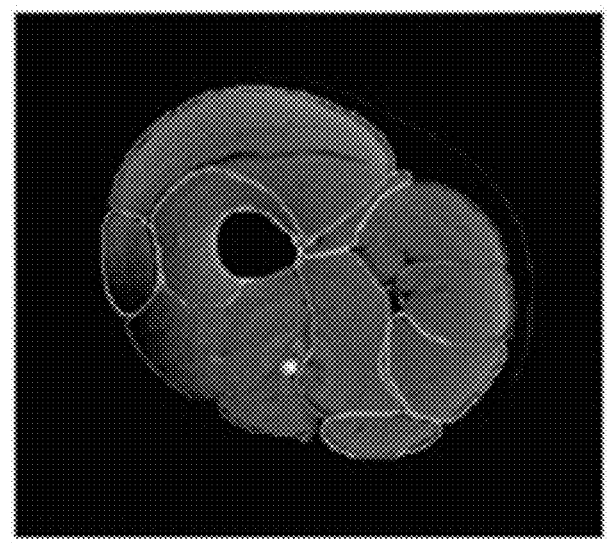
FIG. 9A is a segmented image of an upper leg, according to an example of the present disclosure.

FIGS. 9A-9C show an example of the cross-section segmentation results for both the upper and lower legs as well as the 3D rendered muscle maps directly reconstructed from the automatic segmentation. Almost all muscles have good contour quality and 3D shape. The images can be displayed to the user on a display, such as operator workstation 102. FIG. 9A shows a segmented image of an upper leg obtained with 3D cascaded DCNN. FIG. 9B shows a segmented image of a lower leg obtained with 3D cascaded DCNN. FIG. 9C shows a segmented image of a pair of legs obtained with 3D cascaded DCNN.

Figures 10A, 10B:
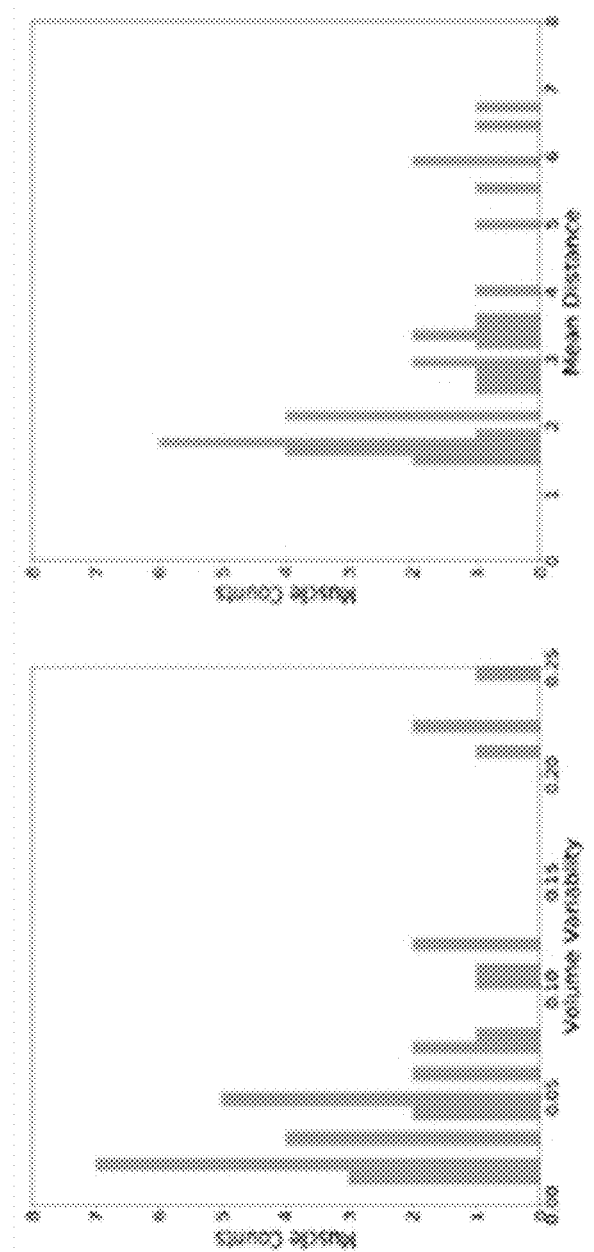
FIG. 10A is a histogram of volume variability, according to an example of the present disclosure.
FIG. 10B is a histogram of mean distance, according to an example of the present disclosure.

FIG. 10A shows the histograms for percentage volume error and FIG. 10B shows the mean surface distance when compared with the ground truth values. Most muscles have less than 5% volume errors and less than 4 mm surface distances. The mean volume error between our segmentation results and ground truth is 6.5%, where 7 muscles have errors larger than 10%: adductor brevis, flexor digitorum longus, obturator externus, obturator internus, pectineus, piriformis and quadratus femoris. Variability is generally higher in muscles with small volumes and irregular boundaries such as quadratus femoris, and in muscles with a medial-lateral orientation such as the deep hip rotators. The overall mean distance is 2.9 mm, where 7 muscles have mean distance values larger than 4 mm. The result is consistent with the Dice scores and shows a strong positive correlation.

FIGS. 11A-E show segmentation of two stages: shows one slice of the segmentation contours of the right adductor longus from both stages (red) and the ground truth labels (green). FIG. 11A is an output image from the first stage. Due to the loss of resolution, the contours were jagged. However, from this contour, the location of the ROI can be accurately identified and the images can be cropped for a more accurate segmentation in stage two. FIG. 11B shows output from stage two using the ground-truth contour as the cropping basis. To show the effectiveness of testing augmentation in stage two, FIG. 11B shows a hypothetical situation in which the images were cropped with the ground truth labels. FIGS. 11C and 11D are outputs from stage two using the stage one output with two different enlargement ratios. FIG. 11E shows output from stage two by averaging multiple enlargement ratios. In practice, the cropping can only be based on the stage one output and thus may contain some errors. However, with multiple cropped images at slightly varied boundaries and the averaged output, FIG. 11E shows good segmentation quality that is comparable with or even superior than FIG. 11B while FIG. 11C and FIG. 11D show the results using only one cropped image based on stage one output with different enlargement ratios. The differences of FIG. 11C and FIG. 11D also show that different bounding boxes can affect the model output, especially at hard-to-tell boundaries.

Figure 12A:
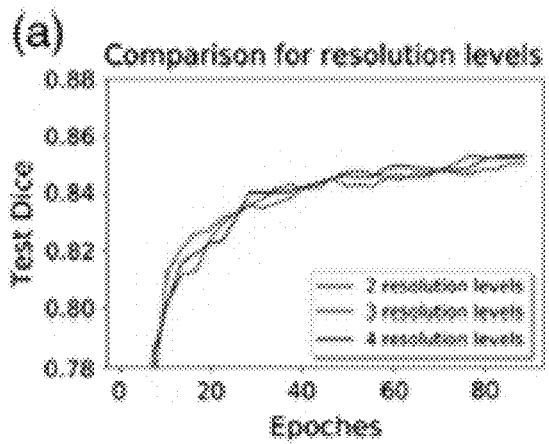
FIG. 12A is Mean Dice scores on the validation dataset as functions of training iterations using U-Net with different resolution levels, according to an example of the present disclosure.
Figure 12B:
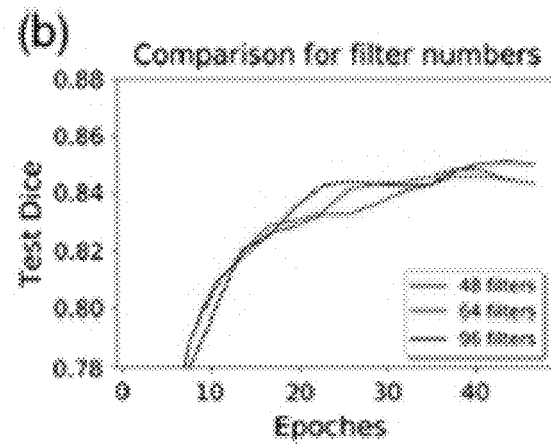
FIG. 12B is a U-Net network with different filter numbers, according to an example of the present disclosure.
Figure 12C:
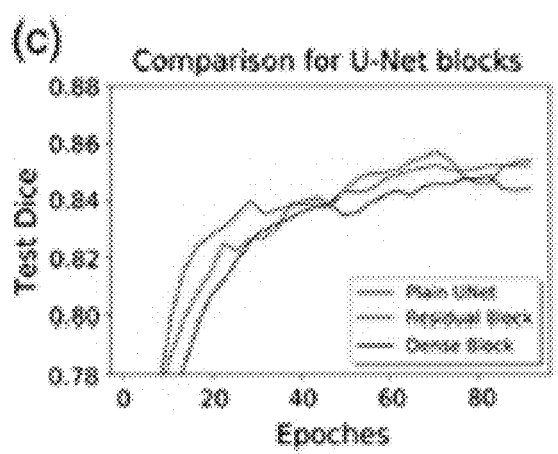
FIG. 12C is different convolutional block structures in U-Net, according to an example of the present disclosure.
Figure 12D:
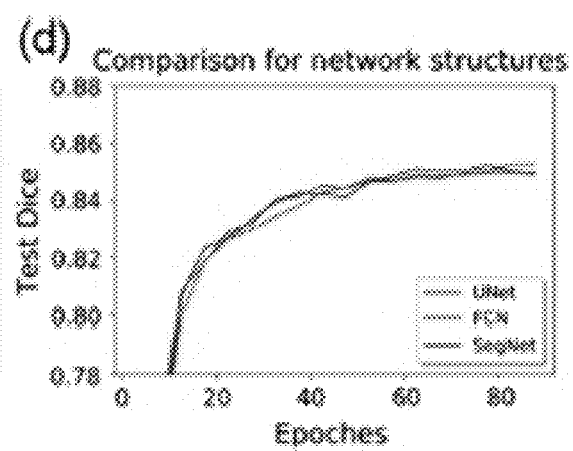
FIG. 12D is different network structures, according to an example of the present disclosure.

FIGS. 12A-D show the averaged Dice scores for all testing cases as a function of the training iterations. FIG. 12A is Mean Dice scores on the validation dataset as functions of training iterations using U-Net with different resolution levels, according to an example of the present disclosure. FIG. 12B is U-Net with different filter numbers, according to an example of the present disclosure. FIG. 12C is different convolutional block structures in U-Net, according to an example of the present disclosure. FIG. 12D is different network structures, according to an example of the present disclosure. FIG. 12A shows the effect of the number of encoding and decoding blocks, which also reflects the number of spatial-resolution levels. Larger number of resolution levels tend to have better results; however, the difference is very small between three and four. FIG. 12B shows the results from different number of filters at the root level for the plain U-Net are compared. More filters can lead to higher Dice scores. FIG. 12C shows the plain U-Net is compared with the U-Net with residual blocks and dense blocks under the same resolution level and similar numbers of filters. Dice score from model with residual blocks is slightly higher than the other two models in the end, however the difference with plain U-Net is small. The U-Net with dense blocks performs the worst among the three network structures. FIG. 12D shows how the U-Net structure is compared with FCN-8s and SegNet. Dice scores from U-Net and SegNet are comparable and slightly better than FCN, especially at early epochs.

Figure 13A:
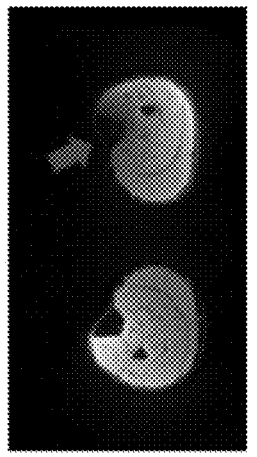
FIG. 13A is muscle images without improved N3 bias correction, according to an example of the present disclosure.
Figure 13B:
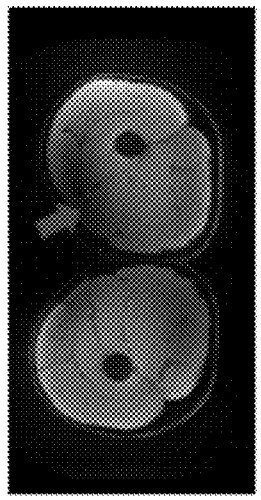
FIG. 13B is muscle images without improved N3 bias correction, according to an example of the present disclosure.
Figure 13C:
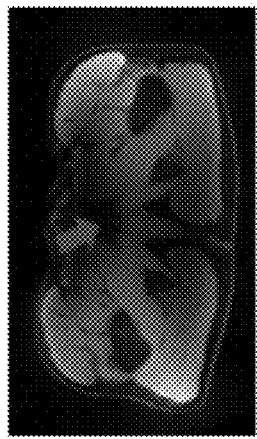
FIG. 13C is muscle images without improved N3 bias correction, according to an example of the present disclosure.
Figure 13D:
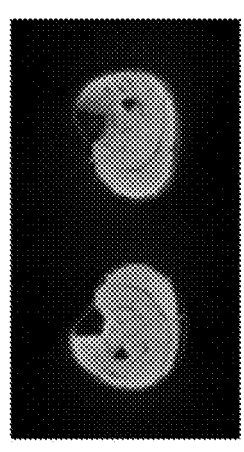
FIG. 13D is muscle images with improved N3 bias correction, according to an example of the present disclosure.
Figure 13E:
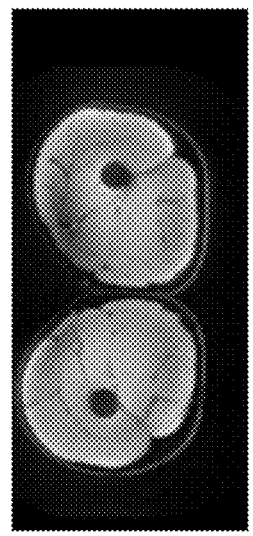
FIG. 13E is muscle images with improved N3 bias correction, according to an example of the present disclosure.
Figure 13F:
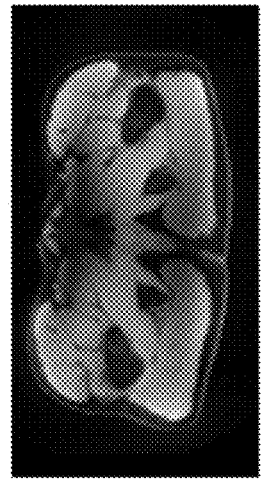
FIG. 13F is muscle images with improved N3 bias correction, according to an example of the present disclosure.

FIGS. 13A-F show the effect of the improved N3 bias correction method in the data pre-processing step. FIGS. 13A-C are muscle images without improved N3 bias correction. FIGS. 13D-F are muscle images with improved N3 bias correction. The bias field in the original image due to B1 inhomogeneity indicated by the red arrow (FIGS. 13A-C) were corrected with this method (FIGS. 13D-F). This normalized the range of pixel values and improved the homogeneity of the images, which can make the training and testing of the model less biased.

The examples of the present disclosure can be implemented, for example, based on the Tensorflow framework and training and testing can be performed on two NVidia 1080Ti GPUs with 11 Gb memory each. During training, the weights were initialized randomly from Gaussian distribution and updated using the Adaptive Moment Estimation (Adam) optimizer24 for gradient descent with an initial learning rate of 0.01 and the pixel-wise cross-entropy as the loss function. Due to memory limitation, the batch size was set to be one. Extensive data augmentation including shearing, rotation and left-right flipping were applied in the training process of both stages. In one or more examples, the system may take the image and the corresponding ground-truth segmentation and do the same operation on both of them. One example includes rotating both of them by a number of different angles. This provides a larger training set for training the neural network, although it is not the same as having more independent training data. For second stage, augmentation was performed after cropping. The training time for a muscle group in stage one was about 2 hours with 2000 iterations and for a muscle in stage two was about 6 hours with 5000 iterations. Testing time was 25-40 seconds per group in first stage and 5-8 seconds per muscle in second stage, which roughly corresponds to 4-6 seconds per 2D slice and 18-24 minutes per case for all the muscles on average with a single GPU.

The images can further be post-processed to provide better images for the user. For example, Post-processing workflow includes false positive reduction through connection analysis and binary closing to guarantee that only one connected, dense and closed 3D volume is kept for each ROI. When combining all ROIs, since each network makes a voxel-by-voxel prediction of whether it belongs to the target ROI, it is possible that different networks predict the same voxel to be different ROIs in the second stage. To resolve conflict, the output probabilities from all these networks were compared and the label with maximum probability was retained. In the end, a modified Ramer-Douglas-Peucker algorithm was used to simplify the original contour boundary points to get a much smaller number of control points, which can be used for convenient contour editing, if necessary.

The images can further be evaluted: To evaluate the segmentation performance, different metrics were calculated including the Dice similarity coefficient (Dice), mean surface distance (MSD) and muscle volumes (V), given as follows:

$$\text{Dice} = \frac{S \cap G}{S \cup G} \quad (1)$$

in which S and G are the automatically segmented ROI label and the ground truth label, respectively. The larger Dice score indicates larger overlap and more accurate segmentation. The mean distance calculates the average distance between the contour of each segmentation and its corresponding ground truth contour. The distance of a single voxel on one contour to another contour is given as:

$$d(p,C) = \min_{p \in C} \|p - p'\|_2 \quad (2)$$

where p is a voxel and C is the contour. The mean is then calculated based of the distances of all voxels on our segmented contour to the ground truth contour. In addition, since in many studies the volume of each muscle was used for subsequent analysis together with performance and injury data, the accuracy in muscle volume quantification is another important criterion for the segmentation quality, which was calculated by taking the summation of the sizes of all voxels belongs to a muscle m, given as:

$$V_m = \text{sum}_{i \in n}(v_i) \quad (3)$$

In comparison, the percentage differences with the ground truth volumes were used to eliminate the effect of volume variations among muscles.

Table 1 summaries the Dice scores of our framework for all 35 muscles as well as the results from an inter-observer variability study conducted on 3 randomly selected subjects. Two independent engineers segmented the same subject and the Dice scores between the two segmentations were calculated. The accuracy of our automated segmentation methods is the same as or even superior than inter-observer variability for most muscles, especially for muscles with large volumes.

TABLE 1

Dice scores of all lower limb skeletal muscles in an inter-observer study and using the proposed automatic segmentation method.

| Muscle name | Inter observer | Proposed method |
| --- | --- | --- |
| adductor brevis | 0.88 | 0.83 ± 0.024 |
| adductor longus | 0.94 | 0.94 ± 0.011 |
| adductor magnus | 0.92 | 0.94 ± 0.015 |
| biceps femoris: long head | 0.95 | 0.94 ± 0.034 |
| biceps femoris: short head | 0.95 | 0.93 ± 0.013 |
| external rotators | 0.84 | 0.70 ± 0.101 |
| fibulari | 0.93 | 0.93 ± 0.036 |
| flexor digitorum longus | 0.94 | 0.85 ± 0.032 |
| flexor hallucis longus | 0.83 | 0.87 ± 0.038 |
| gastrocnemius: lateral head | 0.92 | 0.92 ± 0.016 |
| gastrocnemius: medial head | 0.94 | 0.95 ± 0.012 |
| gluteus maximus | 0.97 | 0.97 ± 0.006 |
| gluteus medius | 0.94 | 0.93 ± 0.013 |
| gluteus minimus | 0.90 | 0.88 ± 0.015 |
| gracilis | 0.96 | 0.94 ± 0.010 |
| iliacus | 0.91 | 0.91 ± 0.033 |

TABLE 1-continued

Dice scores of all lower limb skeletal muscles in an inter-observer study and using the proposed automatic segmentation method.

| Muscle name | Inter observer | Proposed method |
| --- | --- | --- |
| obturator externus | 0.66 | 0.78 ± 0.058 |
| rnobturator internus | 0.78 | 0.78 ± 0.043 |
| pectineus | 0.92 | 0.84 ± 0.036 |
| piriformis | 0.86 | 0.80 ± 0.050 |
| phalangeal extensors | 0.89 | 0.90 ± 0.030 |
| popliteus | 0.90 | 0.88 ± 0.029 |
| psoas major | 0.92 | 0.78 ± 0.067 |
| quadratus femoris | 0.89 | 0.81 ± 0.057 |
| rectus femoris | 0.97 | 0.96 ± 0.026 |
| sartorius | 0.95 | 0.93 ± 0.020 |
| semimembranosus | 0.90 | 0.93 ± 0.030 |
| semitendinosus | 0.95 | 0.93 ± 0.011 |
| soleus | 0.93 | 0.94 ± 0.019 |
| tensor fasciae latae | 0.96 | 0.94 ± 0.016 |
| tibialis anterior | 0.88 | 0.92 ± 0.015 |
| tibialis posterior | 0.94 | 0.90 ± 0.034 |
| vastus intermedius | 0.87 | 0.88 ± 0.026 |
| vastus lateralis | 0.95 | 0.94 ± 0.018 |
| vastus medialis | 0.96 | 0.95 ± 0.009 |

In another example of the present disclosure, although the major part of the target muscles can be extracted through a network with low-resolution images as the input, the muscle boundaries are inaccurate due to the significant loss of fine details. Therefore, a 2nd network based on the output of stage one was trained, which keeps the resolution of the input but with cropped field-of-view to make it fit into the GPU memory. Furthermore, to overcome the issue that the error from the first stage output may negatively affect the accuracy of the second stage and further increase the model performance, a testing augmentation method was used by varying the second stage input multiple times and averaging the results. The robustness against the first stage error is improved and the contours are smoothed due to multiple averages. The final segmentation results achieved similar or even superior performances than humans in 14 muscles while only slightly worse in 21 muscles.

Additionally, the hyperparameters and network structures for segmentation to optimize the results from the second stage are compared. In general, a deeper and wider network can yield better performance. However, it comes at the cost of increased memory requirement and computation time. The benefit with a deeper network is marginal when the resolution level is larger than three, while the width of the network has a more significant influence. One explanation is that for muscle segmentation, very high-level information captured with deep layers of the network may not contribute as much to the results as the low-level image structures such as edges and contrast. Comparing different convolutional block structures, adding short-cut connections to the network only has minimal impact as the differences in Dice scores for the three networks are within 0.01, which is likely due to the fact that the network is relatively shallow so that the effect of short-cut connections to avoid "gradient vanishing" is not significant in this application. With different network structures, Dice scores are also similar. Overall, considering the minimal differences and the fact that the network with residual block needs more parameters and computations, the plain U-Net with three resolution levels, two convolutional layers per level, and 96 filters on the first convolutional layer was used to train all the target muscles in the second stage.

Although the promising overall results suggest that the cascaded DCNN method can achieve high segmentation accuracy and robustness for almost all lower limb skeletal muscles, the performances on muscles with small volumes, such as external rotators, are still suboptimal. In the first stage, the localization network performed poorly and even completely failed to generate any labels for these muscles due to class imbalances. Therefore, any location information may not be accessible from the output labels, and therefore it may require an estimation from neighboring muscles, which may affect the accuracy. Continued work will focus on these muscles, such as using a single output label for the grouped muscles, including the small ones to extract the boundary information. This method cannot use the individually optimized bounding boxes but can greatly reduce the likelihood of failing to predict a bounding box.

Another main limitation is the size and population distribution of the data in this example for the present disclosure. Due to the high cost of obtaining MRIs and manual segmentation, the dataset is small and from a single institution. Therefore, the trained model may have worse performances on images using different imaging protocols and/or scanners. Furthermore, although the muscles from athletes are more difficult to segment as there is fewer intermuscular fat, which can be used to distinguish muscles, compared with healthy populations, it may not be the case for patients with metabolic syndrome or disease, whose MR images may contain more abnormal structures. As the application of this example for the present disclosure is to examine whether targeted training strategies on different muscles can yield enhanced performances and/or reduced injury risk, the example for the present disclosure population is on athletes and the automatic segmentation method developed in this example for the present disclosure can greatly facilitate the data analysis process. Furthermore, although the trained model is limited by the population distribution, the training, and testing method is generic. Based on our experiences, having 40-60 training cases from the desired population can yield good segmentation performances, which can be even reduced if starting from an already-trained model, such as the one optimized for athletes.

FIGS. 14A and 14B show multiple network structures for comparison. FIG. 14A shows a plain U-Net structure. FIG. 14B shows a four-layer U-Net dense block. The plain U-Net structure (FIG. 14A) is used in stage one and two as the baseline. Top right shows an example of a residual block, which adds the previous filter to the latter by elementwise addition. FIG. 14B shows an example of a four-layer dense block, which concatenates each layer to every other layer. Either the residual or the dense block replaces the conventional convolutional block in each resolution level (as shown in the red box) to build the corresponding networks.

What is claimed is:

1. A computer-implemented method for automatic muscle segmentation using one or more processors, the method comprising:
receiving a high-resolution three-dimensional (3D) magnetic resonance imaging (MRI) leg image obtained by an MRI system;
splitting the high-resolution 3D MRI leg image into a plurality of high-resolution 3D sub-images based on different anatomical parts in the high-resolution 3D MRI leg image;
acquiring low-resolution 3D sub-images of the plurality of high-resolution 3D sub-images;
determining a boundary box within each corresponding low-resolution 3D sub-image, wherein the boundary box encloses at least one target muscle in the low-resolution 3D sub-image;

determining a crop box for each boundary box, wherein the crop box is the boundary box increased by a ratio along each dimension;

obtaining a cropped box high-resolution 3D sub-image by cropping each high-resolution 3D sub-image based on its corresponding crop box; and segmenting at least one muscle from the cropped box high-resolution 3D sub-image.

2. The computer-implemented method for automatic muscle segmentation according to claim 1, wherein the method further comprises:

obtaining the high-resolution 3D MRI leg image by using a two-dimensional (2D) multi-slice sequence MRI scan; and correcting image inhomogeneity due to radiofrequency field variations.

3. The computer-implemented method for automatic muscle segmentation according to claim 1, determining the boundary box comprises:

using a trained detection-based neural network, wherein the neural network is trained to detect muscles in the low-resolution 3D sub-image and generate the boundary box based on pixel-wise prediction maps.

4. The computer-implemented method for automatic muscle segmentation according to claim 3, further comprising:

obtaining grouped muscles by grouping a plurality of adjacent muscles; and optimizing the detection-based neural network by training the neural network to detect grouped muscles together.

5. The computer-implemented method for automatic muscle segmentation according to claim 1, determining the crop box comprises:

enlarging the boundary box by a ratio randomly chosen from a range along each dimension.

6. The computer-implemented method for automatic muscle segmentation according to claim 1, segmenting at least one muscle from the cropped box high-resolution 3D sub-image comprises:

using a trained convolutional neural network, wherein the convolutional neural network is trained to segment individual muscles in the high-resolution 3D sub-image.

7. The computer-implemented method for automatic muscle segmentation according to claim 6, wherein segmenting at least one muscle from the cropped box high-resolution 3D sub-image further comprises:

an averaging method that improves the segmentation accuracy and contour smoothness comprising:

cropping a series of high-resolution 3D sub-images based on their corresponding crop box;

segmenting at least one muscle from the series of cropped box high-resolution 3D sub-images; and averaging the segmented series of cropped box high-resolution 3D sub-images after replacing the un-segmented high-resolution 3D sub-images as a final label map.

8. The computer-implemented method for automatic muscle segmentation according to claim 1, wherein the method further comprises after segmenting at least one muscle from the cropped box high-resolution 3D sub-image:

segmenting at least one small muscle based on the segmentation of at least one neighboring large muscle, wherein the small and large muscles are target muscles enclosed in the boundary box.

9. The computer-implemented method for automatic muscle segmentation according to claim 1, wherein splitting the high-resolution 3D MM leg image into a plurality of high-resolution 3D sub-images comprises:

splitting the high-resolution 3D MM leg image based on superior-inferior coordinates and estimated ratios of sub-anatomical lengths the high-resolution 3D MM leg image is split into.

10. The computer-implemented method for automatic muscle segmentation according to claim 1, further comprising:

segmenting the at least one muscle from the cropped box high-resolution 3D sub-image to obtain a segmented high-resolution 3D MRI leg image;

determining quantitative metrics of muscle volume based on the segmented high-resolution 3D MRI leg image; and displaying the segmented high-resolution 3D MRI leg image.

11. The computer-implemented method for automatic muscle segmentation according to claim 1, further comprising:

resizing and merging from the cropped box high-resolution 3D sub-image.

12. An apparatus for automatic muscle segmentation, comprising:

one or more processors;

a display; and a non-transitory computer readable memory storing instructions executable by the one or more processors, wherein the instructions are configured to:

receive a high-resolution three-dimensional (3D) magnetic resonance imaging (MRI) leg image obtained by an MRI system;

split the high-resolution 3D MRI leg image into a plurality of high-resolution 3D sub-images based on different anatomical parts in the high-resolution 3D MRI leg image;

acquire low-resolution 3D sub-images of the plurality of high-resolution 3D sub-images;

determine a boundary box within each corresponding low-resolution 3D sub-image, wherein the boundary box encloses at least one target muscle in the low-resolution 3D image;

determine a crop box for each boundary box, wherein the crop box is the boundary box increased by a ratio along each dimension;

obtain a cropped box high-resolution 3D sub-image by cropping each high-resolution 3D sub-image based on its corresponding crop box;

segment at least one muscle from the cropped box high-resolution 3D sub-image to obtain a segmented high-resolution 3D MM leg image; and display the segmented high-resolution 3D MRI leg image.

13. The apparatus for automatic muscle segmentation according to claim 12, wherein the instructions are further configured to:

obtain the high-resolution 3D MRI leg image by using a two-dimensional (2D) multi-slice sequence MRI scan; and correct image inhomogeneity due to radiofrequency field variations.

14. The apparatus for automatic muscle segmentation according to claim 12, wherein determine the boundary box comprises:

use a trained detection-based neural network, wherein the neural network is trained to detect muscles in the low-resolution 3D sub-image and generate the boundary box based on pixel-wise prediction maps.

15. The apparatus for automatic muscle segmentation according to claim 14, further comprising:
  obtain grouped muscles by grouping a plurality of adjacent muscles; and
  optimize the detection-based neural network by training the neural network to detect grouped muscles together.

16. The apparatus for automatic muscle segmentation according to claim 12, wherein determine the crop box comprises: enlarging the boundary box by a ratio randomly chosen from a range along each dimension.

17. The apparatus for automatic muscle segmentation according to claim 12, wherein segment at least one muscle from the cropped box high-resolution 3D sub-image comprises:
  using a trained convolutional neural network, wherein the convolutional neural network is trained to segment individual muscles in the plurality of high-resolution 3D sub-images.

18. The apparatus for automatic muscle segmentation according to claim 17, wherein segment at least one muscle from the cropped box high-resolution 3D sub-image further comprises:
  an averaging method that improves the segmentation accuracy and contour smoothness comprising:
  cropping a series of high-resolution 3D sub-images based on their corresponding crop box;
  segment at least one muscle from the series of cropped box high-resolution 3D sub-images; and
  averaging the segmented series of cropped box high-resolution 3D sub-images after replacing the un-segmented high-resolution 3D sub-images as a final label map.

19. The apparatus for automatic muscle segmentation according to claim 12, wherein the method further comprises after segmenting at least one muscle from the cropped box high-resolution 3D sub-image:
  segment at least one small muscle based on the segmentation of at least one neighboring large muscle, wherein the small and large muscles are target muscles enclosed in the boundary box.

20. The apparatus for automatic muscle segmentation according to claim 12, further comprising:
  determining quantitative metrics of muscle volume based on the segmented high-resolution 3D MRI leg image; and
  displaying the segmented high-resolution 3D MRI leg image.

21. A non-transitory computer-readable storage medium having stored therein instructions that, when executed by one or more processors of an apparatus causing the apparatus to perform acts comprising:
  receiving a high-resolution three-dimensional (3D) magnetic resonance imaging (MM) leg image obtained by an MRI system;
  splitting the high-resolution 3D MM leg image into a plurality of high-resolution 3D sub-images based on different anatomical parts in the high-resolution 3D MRI leg image;
  acquiring low-resolution 3D sub-images of the plurality of high-resolution 3D sub-images;
  determining a boundary box within each corresponding low-resolution 3D sub-image, wherein the boundary box enclose at least one target muscle in the low-resolution 3D sub-image;
  determining a crop box for each boundary box, wherein the crop box is the boundary box increased by a ratio along each dimension;
  obtaining a cropped box high-resolution 3D sub-image by cropping each high-resolution 3D sub-image based on its corresponding crop box;
  segmenting at least one muscle from the cropped box high-resolution 3D sub-image; and
  displaying the segmented high-resolution 3D MRI leg image.

* * * * *